United States Patent [19]

Schneider et al.

[11] Patent Number: 4,492,023

[45] Date of Patent: Jan. 8, 1985

[54] ELECTRICAL HARNESS FABRICATION METHOD AND APPARATUS

[75] Inventors: Thomas E. Schneider, Burbank; Jack F. Funcik, Downers Grove, both of Ill.

[73] Assignee: Molex Incorporated, Lisle, Ill.

[21] Appl. No.: 422,867

[22] Filed: Sep. 24, 1982

[51] Int. Cl.[3] .................... H01R 43/04; B23P 19/00

[52] U.S. Cl. .................... 29/861; 29/749; 29/857

[58] Field of Search .................... 29/857, 861, 747, 748, 29/749; 206/820

[56] References Cited

U.S. PATENT DOCUMENTS

| | | | |
|---|---|---|---|
| 3,550,856 | 12/1970 | Wise et al. | 206/820 X |
| 4,055,889 | 11/1977 | Fuseo et al. | 29/748 X |
| 4,235,015 | 11/1980 | Funcik et al. | 29/857 |
| 4,360,969 | 11/1982 | Collier | 29/857 X |
| 4,363,167 | 12/1982 | Boutchen et al. | 29/861 X |

FOREIGN PATENT DOCUMENTS

| | | | |
|---|---|---|---|
| 37202 | 10/1981 | European Pat. Off. | 29/749 |

*Primary Examiner*—Howard N. Goldberg
*Assistant Examiner*—Carl J. Arbes
*Attorney, Agent, or Firm*—Louis A. Hecht

[57] ABSTRACT

A method and apparatus for fabricating a plurality of electrical harnesses is disclosed. Each electrical harness includes at least one connector defined by a housing with insulation displacement type contacts loaded therein. The apparatus sequentially feeds sets of connectors to a first station wherein each set includes a plurality of housings joined together by integral, severable connecting tabs. Each set of connectors is then moved to a second station and wires are inserted into the aligned contacts. Additional functions such as drawing lengths of the wires, forming loops of differing magnitudes in the wires and removing insulation from the wires may also be performed by the apparatus. At the completion of the desired functions, the apparatus is actuated to remove the connecting tabs from between the housings thereby forming a plurality of individual harnesses. The individual harnesses are then ejected.

13 Claims, 8 Drawing Figures

ELECTRICAL HARNESS FABRICATION METHOD AND APPARATUS

BACKGROUND OF THE INVENTION

1. Field of the Invention

The present invention relates generally to a method and apparatus for fabricating a plurality of electrical harnesses. Each harness includes a connector defined by a housing with insulation displacement type contacts loaded therein connected to an insulation clad wire. More particularly, the present invention relates to a method and apparatus for producing sets of electrical harnesses defined by connectors including chained housings with insulation displacement type contacts loaded therein. The chained housings are joined together by integral connecting tabs which are removed or severed once assembly is completed producing a plurality of individual electrical harnesses.

2. Brief Description of the Prior Art

Manufacturers of electronic products are relying on electrical harnesses employing insulation displacement type contacts to avoid many of the inefficiencies and costs associated with other types of electrical connections. A typical electrical harness that is now widely accepted includes a connector with a housing in which insulation displacement type contacts are positioned. Some or all of the contacts are electrically connected to insulation clad wires that may be of different lengths with different segments of insulation removed from the ends of the wire remote from the connector.

Automatic equipment is often employed to fabricate electrical harnesses of the type described. One example of a method and apparatus for fabricating an electrical harness of this type is disclosed in U.S. Pat. No. 4,235,015 which issued on Nov. 25, 1980. This patent and its disclosure are incorporated by reference herein. Generally, U.S. Pat. No. 4,235,015 discloses a method and apparatus for fabricating an electrical harness of the type described by locating a connector at a position on the apparatus to allow insertion of a plurality of insulation clad wires into corresponding contacts within a single housing, drawing a predetermined length of wire, cutting the wires, forming loops in the wires and removing a portion of the insulation on the wire at the end distant from the connector. The apparatus and method as disclosed in U.S. Pat. No. 4,235,015 results in the production of a single harness for each cycle of the apparatus. It is highly desirable to produce several harnesses simultaneously since this would be more economical and efficient, particularly for harnesses having relatively few wires.

SUMMARY OF THE INVENTION

It is, therefore, a principal object of the present invention to provide an improved method and apparatus for fabricating a plurality of electrical harnesses of the type including at least one connector defined by a housing with insulation displacement type contacts. Each contact is connected to an insulation clad wire. The method of the present invention includes positioning a set of electrical harnesses joined together by integral connecting tabs in the apparatus, inserting at least one insulation clad wire in each insulation displacement type contact, performing any other desired operation on the wire depending on the ultimate use of the electrical harnesses and removing the connecting tabs.

It is also an object of the present invention to provide a chain of electrical harnesses joined by integral connecting tabs. The chained harnesses are positioned by an apparatus to allow insertion of a plurality of insulation clad wires into insulation displacement type contacts loaded in each harness. Thereafter, the integral connecting tabs are removed or severed producing a plurality of finished electrical harnesses.

It is another object of the present invention to provide an improved apparatus to practice the method recited above and to remove the integral connecting tabs to produce a plurality of electrical harnesses during each cycle of the apparatus. The apparatus is generally of the type including a first station to which sets of connectors with chained housings are fed. Each housing includes at least one insulation displacement type contact loaded therein. A second station remote from the first station is also included and is provided with structure for inserting insulation clad wires into the insulation displacement type contacts. The improvement in the present invention includes structure for removing or severing the integral connecting tabs joining the harnesses at the completion of the assembly of the electrical harnesses.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DESCRIPTION OF THE PREFERRED EMBODIMENT

In order to depict in an understandable fashion the method for fabricating electrical harnesses in accordance with the principles of the present invention, the apparatus for fabricating electrical harnesses is illustrated schematically in FIGS. 1-8. For more detailed illustrations and disclosure of portions of the apparatus, reference may be made to U.S. Pat. No. 4,235,015 incorporated by reference herein.

I. Introduction

Figure 6:
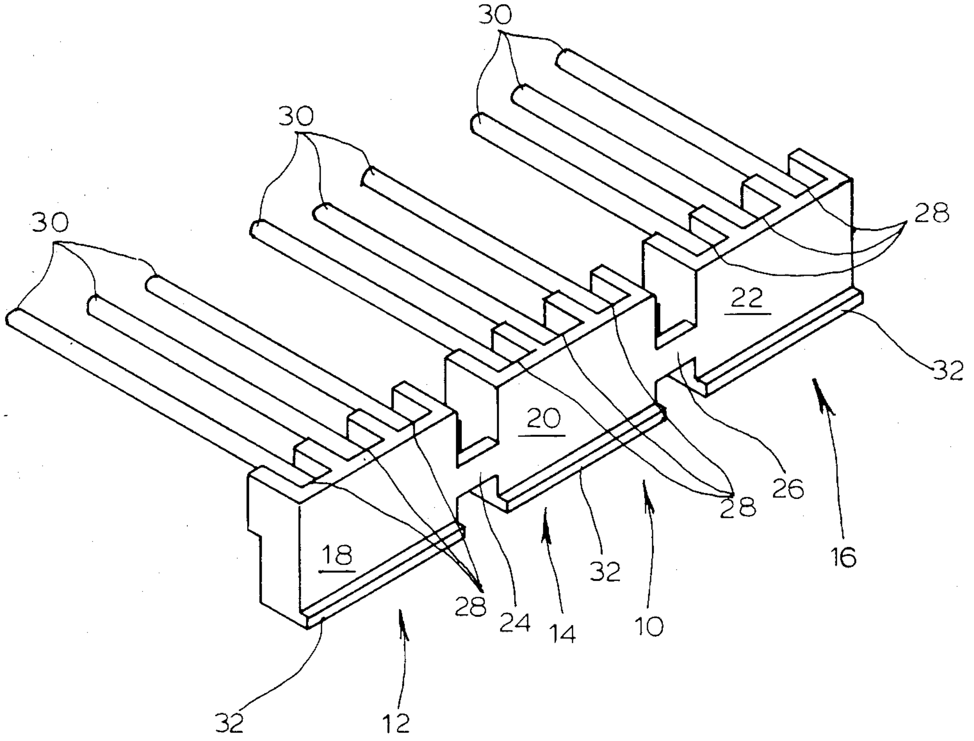
FIG. 6 is an enlarged perspective view of a set of electrical harnesses joined by connecting tabs.

To understand the product produced by the apparatus and method of the present invention, attention is directed first to FIG. 6 illustrating a set of electrical harnesses generally designated by the reference numeral 10. The set of electrical harnesses 10 includes three electrical harnesses 12, 14, and 16 each of which is defined by a housing 18, 20 and 22, respectively, that are chained or joined together by integral connecting tabs 24 and 26. In the illustrated arrangement the housings 18, 20 and 22 are identical, but the principles of the invention are also applicable to joined sets of different housings. Within each of the insulated housings 18, 20 and 22 there may be positioned a plurality of insulation displacement type contacts (not shown). In the particular housings 18, 20 and 22 illustrated, a contact is positioned in each of the identical slots 28 and insulated wires 30 are positioned within each slot 28 in the insulation displacement connectors. If fewer wires 30 are required, the connector may include one or more voids or slots 28 having no wires 30. Each electrical harness 12, 14 and 16 includes a locking ramp 32 that may be used to lock each electrical harness 12, 14 and 16 onto a P.C. board or similar device; however, it should be understood that this design is not limiting and the locking ramps 32 need not be included.

An important feature of the set of harnesses 10 are the connecting tabs 24 and 26 that connect the housings 18, 20 and 22 as illustrated in FIG. 6. The tabs 24 and 26 hold the harnesses 12, 14 and 16 as a unit at predetermined distances from each other allowing insertion of a plurality of wires 30 into the correct contacts in a single operation.

II. Description of the Electrical Harness Fabrication Apparatus

To assist in describing the present invention, each set 10 of harnesses will be referred to as a set of connectors prior to the insertion of wires into the contacts. After the step of inserting the wires 30 has been performed, each set 10 will be referred to as a set of electrical harnesses.

Figure 1:
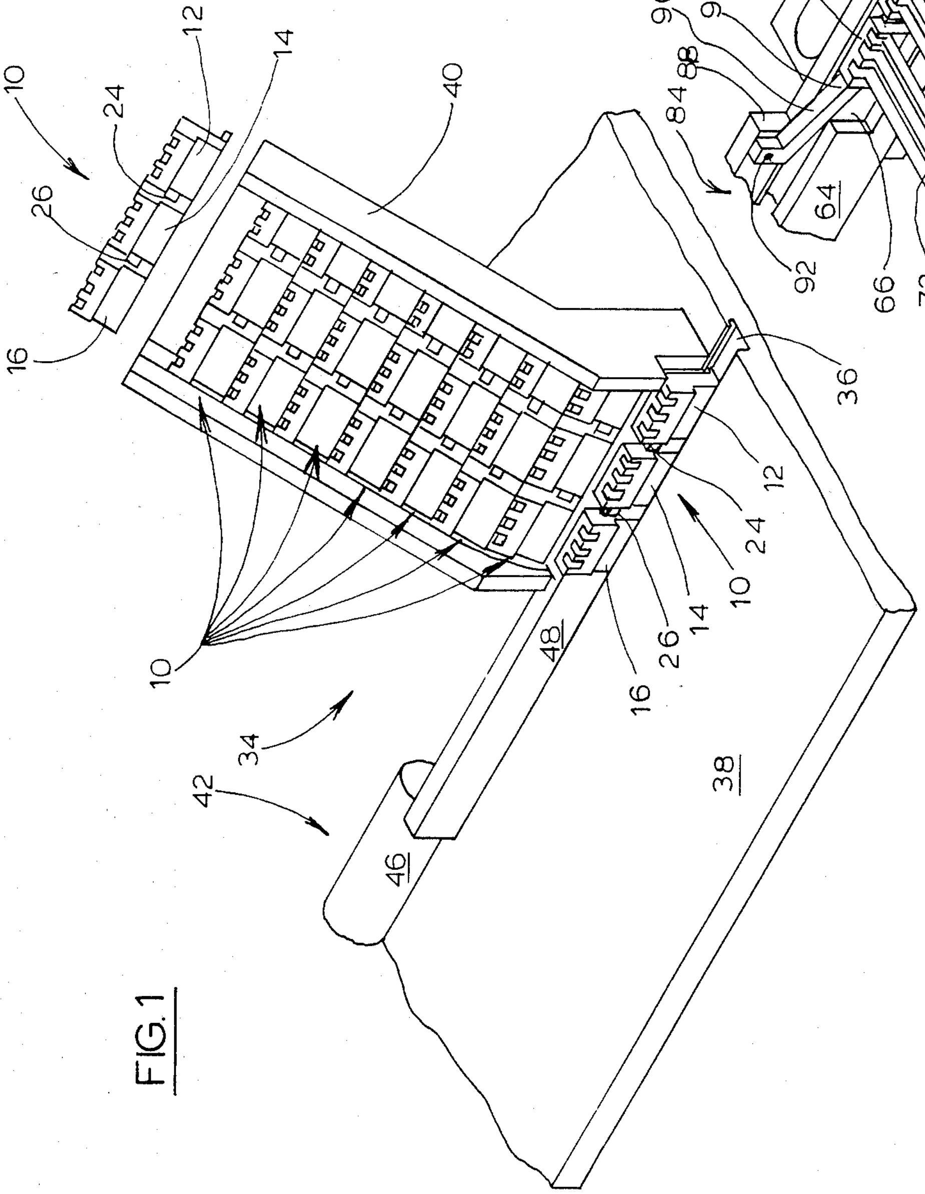
FIG. 1 is a perspective view of a connector feed station of an apparatus constructed in accordance with the principles of the present invention.

Turning now to FIG. 1 there is generally illustrated a connector feed station 34 that is defined on an electrical harness fabricating apparatus. The connector feed station 34 sequentially feeds sets of connectors 10 into an elongated track 36 defined in a platform 38. Insulation displacement contacts are preloaded into the housings of the sets of connectors 10. The track 36 is of a configuration to accommodate and hold sets of connectors 10 in an upright position and to allow sliding along the track 36. The sets of connectors 10 are fed into the track 36 by a magazine 40 that holds a number of sets of connectors 10 to allow continuous, sequential feeding.

Figure 2:
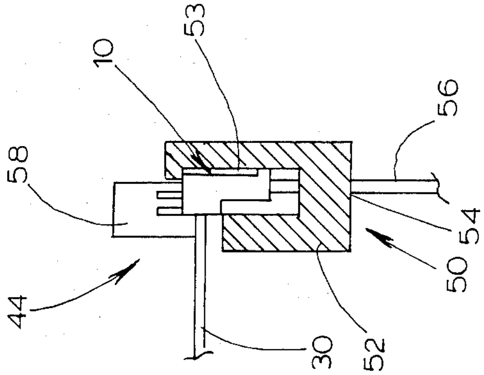
FIG. 2 is a vertical cross-sectional view of the wire insertion station of an apparatus constructed in accordance with the principles of the present invention.

Once a set of connectors 10 has been positioned in the track 36, a shuttle assembly generally designated by the reference numeral 42 is actuated by an advancing drive (not shown) to advance the set of connectors 10 to a second, wire insertion station generally designated by the reference numeral 44 (FIG. 2). The shuttle assembly 42 includes a first member 46 that is a portion of the advancing drive and a connector engaging member 48 secured to member 46 and positioned within track 36 to engage the set of connectors 10.

The second station 44 (FIG. 2) includes a carrier 50 that is aligned with track 38 to accept and locate a set of connectors 10. The carrier 50 includes a generally U-shaped connector nest 52 with a central passage 53 and an opening 54 in the bottom thereof. Connector insertion pins 56 extend through opening 54 to engage the set of connectors 10. The connectors 10 are moved upwardly toward an insertion blade 58 and the insulated wires 30 are inserted into the insulation displacement contacts in each connector 12, 14 and 16 in substantially the same manner as disclosed in U.S. Pat. No. 4,235,015 and reference to this patent may be made for a more detailed description for this procedure and of other operations which may be carried out such as wire looping, cutting, and insulation stripping.

Figure 3:
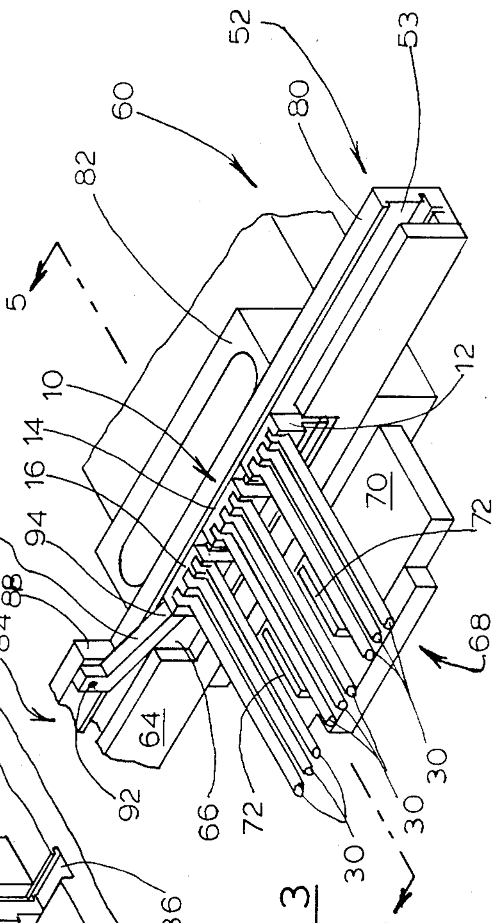
FIG. 3 is a perspective view of a tab removing assembly included in an apparatus constructed in accordance with the principles of the present invention.

The tabs 24 and 26 maintain a fixed spacial relationship between each of the housings 18, 20 and 22 and between all of the slots 28 so that the wire insertion operation can be carried out automatically. Once wires 30 have been inserted within the insulation displacement contacts and any other desired operations have been performed, the connecting tabs 24 and 26 are no longer necessary and are removed to free the individual harnesses. A carrier drive (not shown) is actuated moving the carrier 50 to a tab removing station on the apparatus generally designated by the reference numeral 60 (FIG. 3). The tab removal station 60 includes a mounting plate 62 on which an extension of the connector nest 52 is secured. A portion of the front wall 64 of the connector nest 52 is removed to define an access area generally designated by the reference numeral 66 within which the sets of electrical harnesses 10 are positioned. Adjacent to and extending outwardly from the opening 66 is a tab removal or cutting member generally designated by the reference numeral 68. The tab removal member 68 includes a base 70 reciprocally mounted within the mounting plate 62 and actuated by a cutting base actuation drive (not shown). On the upper surface of the base 70 are a plurality of cutting members 72 corresponding to the number and position of the tabs 24 and 26.

Figure 7:
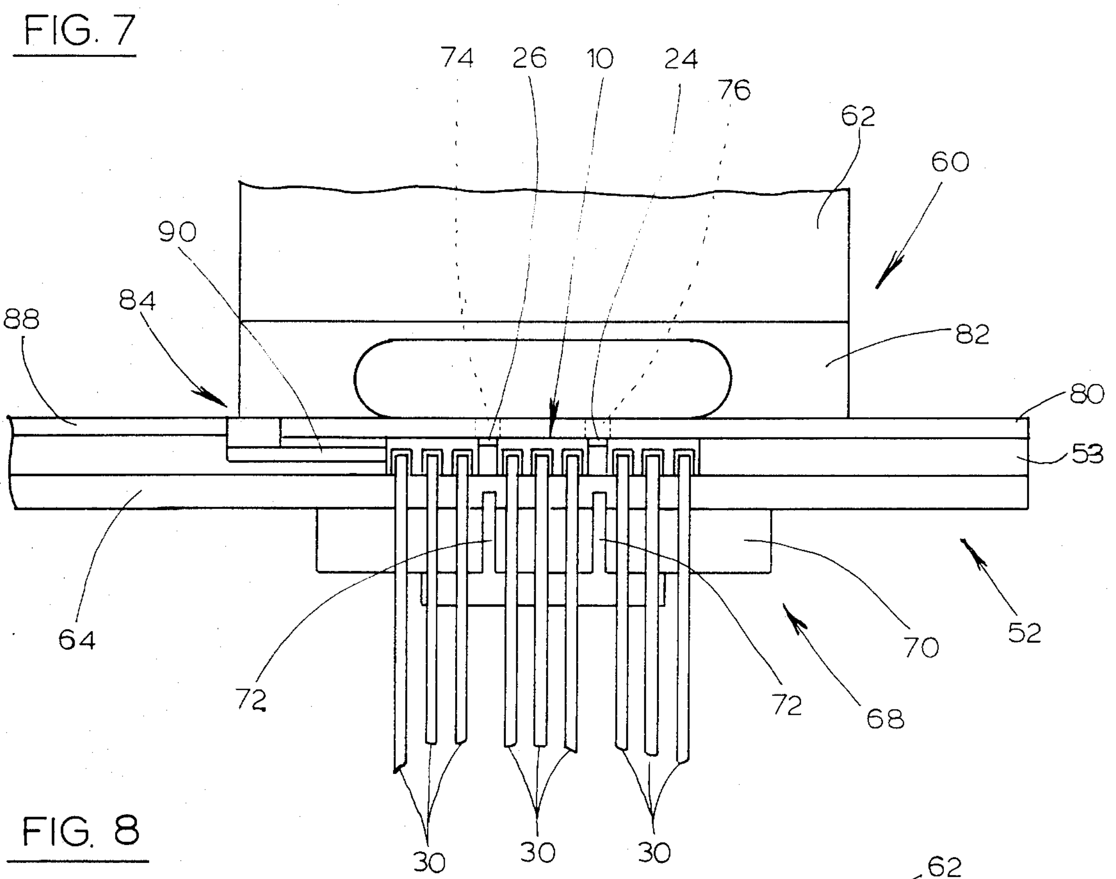
FIG. 7 is a top plan view of the tab removing assembly illustrated in FIG. 3 prior to removal of the connecting tabs.
Figure 8:
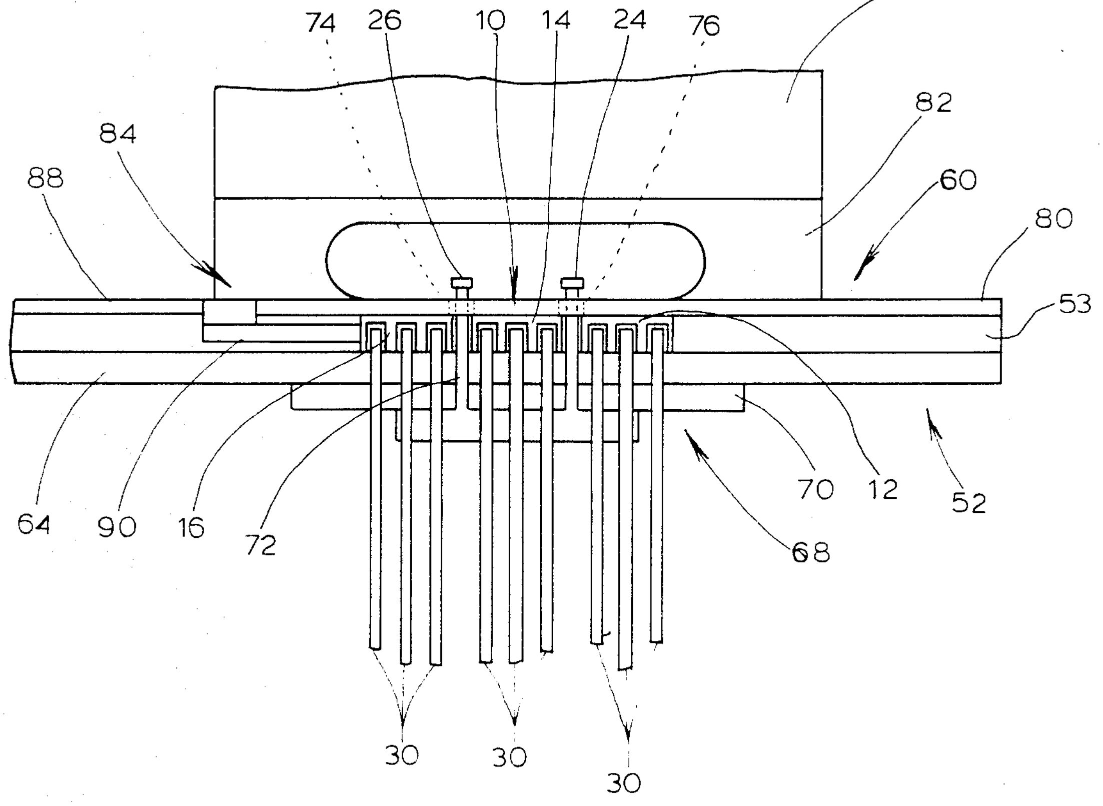
FIG. 8 is a view similar to FIG. 7 illustrating the removal of the connecting tabs.

Once a set of electrical harnesses 10 is positioned within the open area 66, the base 70 is reciprocated to advance the cutting members 72 from the position illustrated in FIG. 7 to the cutting position illustrated in FIG. 8 whereupon the cutting members 72 extend through the opening 66, engage and sever the connecting tabs 24 and 26 and push the connecting tabs 24 and 26 through apertures 74 and 76 in a back wall 80 of the connector nest 52. An open top receptacle or container 82 is secured to the mounting plate 62 at a location behind the openings 74 and 76. The container 82 collects the removed tabs 24 and 26 and deposits them through an opening 83 (FIG. 5) for disposal. Once the removed connecting tabs 24 and 26 have been deposited in receptacle 82, the base 70 is returned to the original position illustrated in FIG. 7. The separate and individual electrical harnesses 12, 14 and 16 may now be ejected from the apparatus for storage or use.

Figure 4:
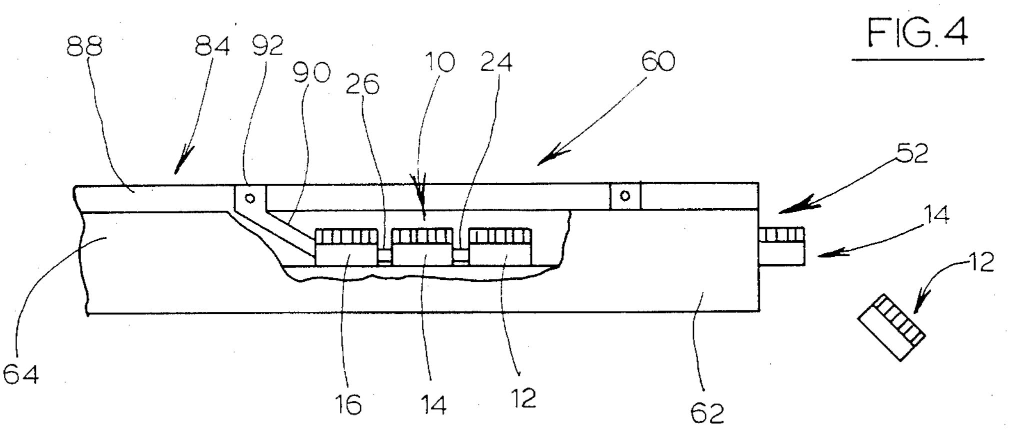
FIG. 4 is a front, partially cut-away view of the tab removing assembly illustrated in FIG. 3.
Figure 5:
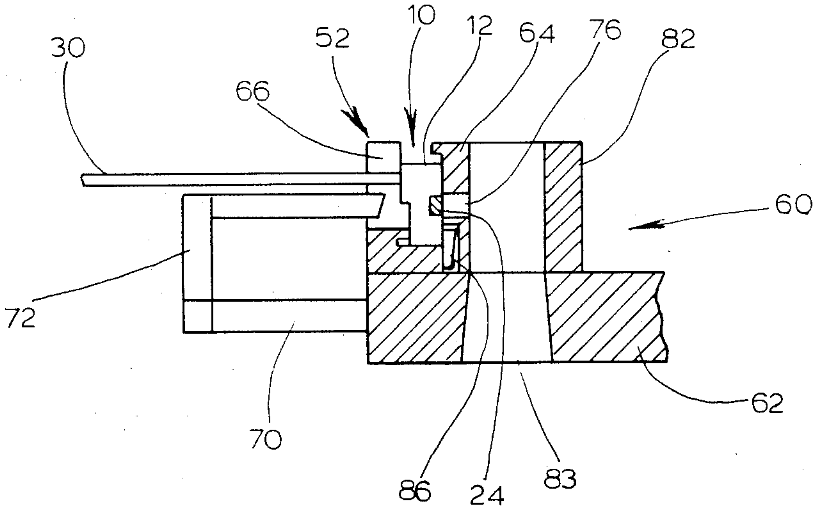
FIG. 5 is a view taken generally along line 5—5 of FIG. 3.

Ejection of the assembled electrical harnesses 12, 14 and 16 is accomplished by an ejection assembly generally designated by the reference numeral 84 (FIG. 3). The ejection assembly 84 operates in conjunction with one or more stop members 86 (FIG. 5). The stop members 86 are located in the connector receiving channel 53 to prevent backward movement of the sets of connectors 10 during the cutting operation. The ejection assembly 84 includes a base member 88 connected to an ejection drive (not shown) and an ejection pawl or lever 90 pivotally mounted by a pin 92 to the member 88. A distant end 94 of lever 90 engages the rear electrical harness 16. At the completion of the tab cutting operation, the ejection drive actuates the ejection assembly 84 to move the individual electrical harnesses 12, 14 and 16 out of the connector nest 52 (FIG. 4). Once the fully assembled electrical harnesses 12, 14 and 16 have been ejected from the apparatus, the ejection assembly 84 is reciprocated in a rearward direction and lever 90 pivots over the stop 86 to return to the original position (FIG. 3).

The apparatus and process of the present invention results in the production of several electrical harnesses during each cycle substantially increasing the efficiency of operation and reducing the cost of the individual electrical harnesses. The apparatus and method described above may be used on several types of electrical harnesses and the configuration and number of electrical harnesses included in each set 10 is not intended to be limited. Many modifications and variations of the present invention are possible in light of the above teachings. Thus, it is to be understood that, within the scope of the appended claims, the invention may be practiced other than as specifically described.

What is claimed is:

1. A method of producing a plurality of electrical harnesses wherein each harness includes a connector defined by a housing with at least one insulation displacement type contact loaded therein, said method comprising the steps of:

(a) forming a set of connectors with the housings of the connectors in the set being joined together in a predetermined, spaced relationship by integral, severable connecting tabs;
(b) simultaneously inserting a wire into at least one insulation displacement contact of each connector of said set; and
(c) severing said connecting tabs to separate said set of connectors into a plurality of individual harnesses.

2. The method of claim 1 further comprising the step of ejecting said individual harnesses and feeding a new set of connectors for termination.

3. The method of claim 1 further comprising the steps of collecting and disposing of said severed connecting tabs.

4. A method of producing a plurality of electrical harnesses, each harness including a connector defined by a housing with at least one insulation displacement type contact loaded therein, said method comprising the steps of:

(a) feeding a set of interconnected connectors spaced predetermined distances from each other by connecting tabs to a first station,
(b) positioning a plurality of wires in alignment with at least one contact of each connector at a second station remote from said first station,
(c) moving said set of interconnected connectors to said second station with at least one contact of each connector in alignment with a wire disposed at said second station,
(d) simultaneously inserting an aligned wire into at least one aligned contact of each connector, and
(e) removing said connecting tabs to form a plurality of separate harnesses.

5. The method of claim 4 further comprising the steps of ejecting said separate harnesses and feeding a new set of connectors to said first station.

6. The method of claim 4 wherein said connecting tabs are integral with the connectors and further comprising the step of collecting said removed integral connecting tabs.

7. A method of producing a plurality of electrical harnesses wherein each harness includes a connector defined by a housing with a plurality of terminal receiving slots formed therein spaced apart a first predetermined distance with at least one insulation displacement type contact in one of said slots of each connector, said method comprising the step of:

(a) providing at least two adjacent housings wherein said housings include integrally formed tabs connecting each other to maintain said second predetermined distance between adjacent housings;
(b) loading a set of connectors so that adjacent slots of adjacent connectors are spaced apart a second predetermined distance;
(c) positioning a plurality of spaced apart wires over at least one contact of each housing; and
(d) simultaneously inserting the wires into their corresponding contacts.

8. The method of claim 7 wherein said second predetermined distance is an integer multiple of said first predetermined distance.

9. An apparatus for producing a plurality of electrical harnesses wherein each said electrical harness includes a connector defined by a housing with at least one insulation displacement type contact loaded therein, said apparatus comprising:

a connector feed station defined on said apparatus,
means operatively associated with the connector feed station for feeding a set of connectors to said connector feed station wherein said set of connectors includes a plurality of housings spaced predetermined distances from each other and joined together by connecting tabs,
a second station defined on said apparatus spaced from and operatively associated with said connector feed station,
means operatively associated with said connector feed station and said second station for moving said set of connectors from said connector feed station to said second station,
means operatively associated with said second station for simultaneously inserting a wire into at least one of said insulation displacement type contacts of each connector, and
tab removing means operatively associated with said tabs after wire insertion for removing said connecting tabs to separate said set of connectors into a plurality of independent harnesses.

10. The apparatus set forth in claim 9 further comprising a connector-contacting solid member in alignment with said plurality of independent harnesses for ejecting said plurality of independent harnesses.

11. The apparatus set forth in claim 10 wherein said connector-contacting solid member comprises a pawl rotatably mounted on said apparatus in longitudinal alignment with said plurality of independent harnesses and a stop mechanism in alignment with said plurality of independent harnesses to prevent reverse movement of said set of connectors during a tab removal.

12. The apparatus set forth in claim 9 further comprising a container disposed adjacent the tab removing means for collecting said removed tabs.

13. The apparatus set forth in claim 9 wherein said tab removing means comprises a cutting member reciprocally mounted on said apparatus adjacent said second station.

* * * * *